UNITED STATES PATENT OFFICE.

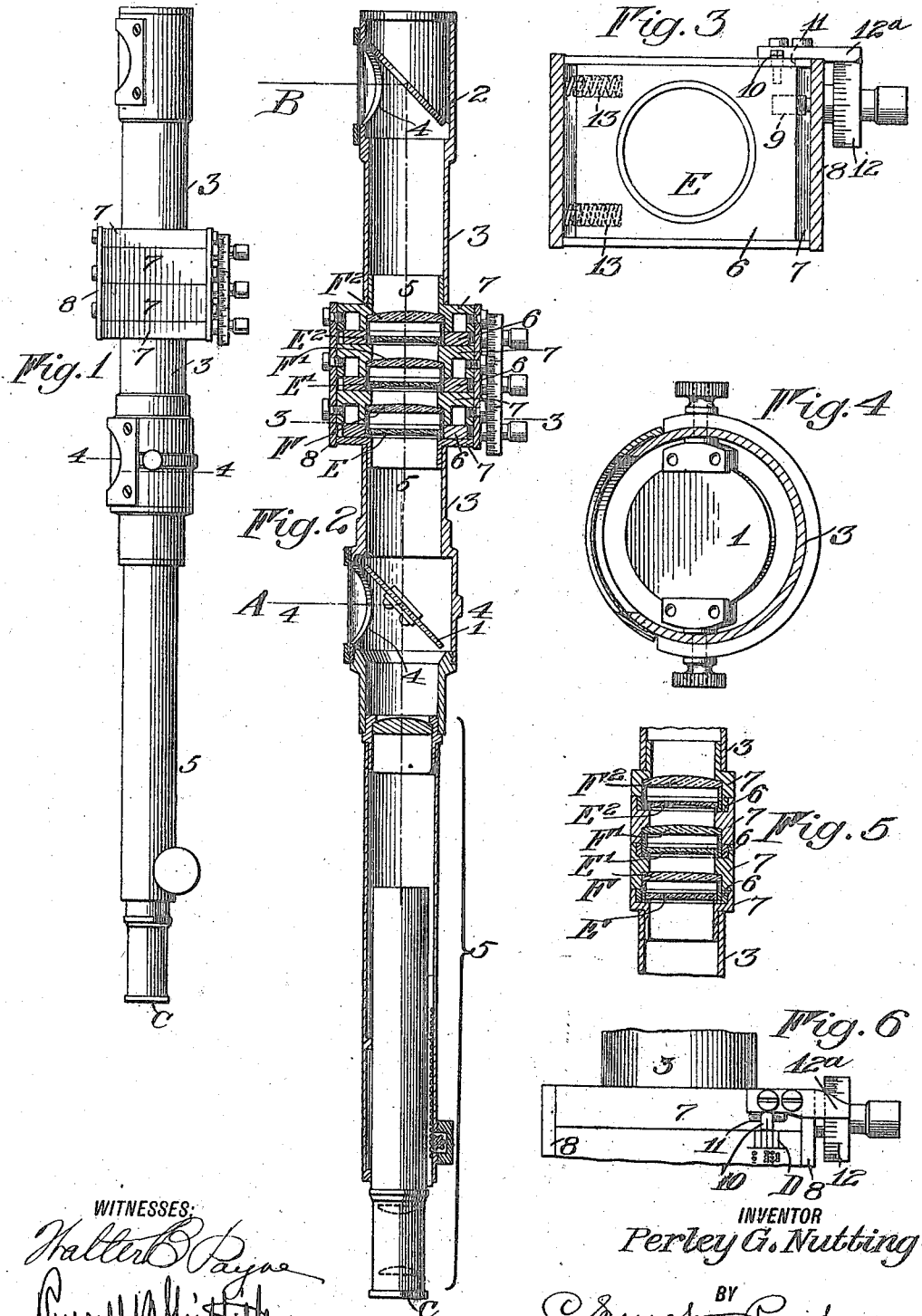

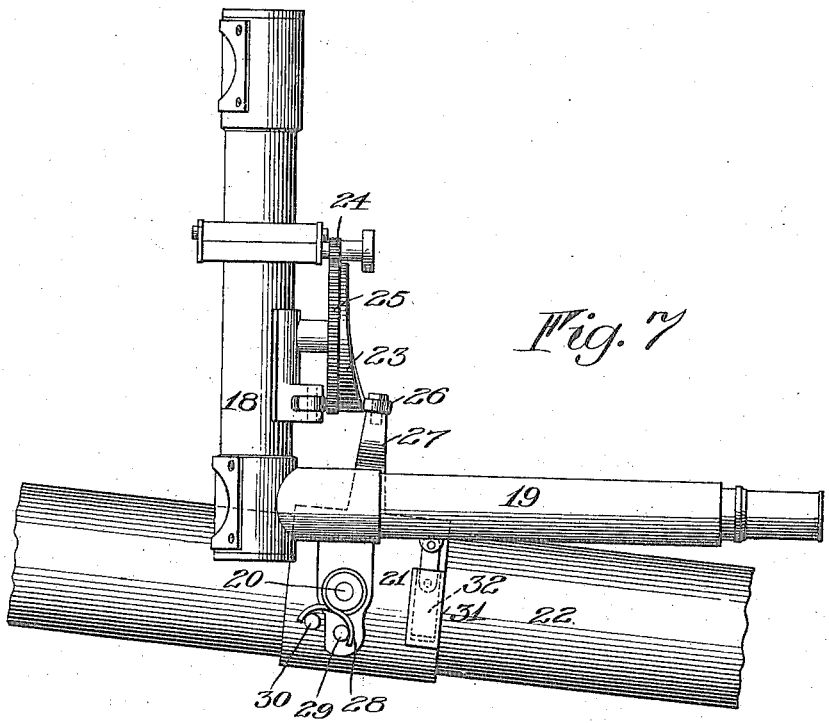
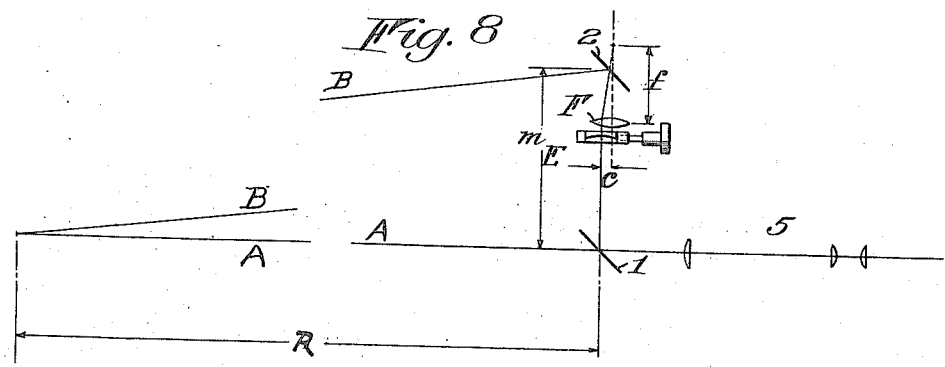

PERLEY G. NUTTING, OF ROCHESTER, NEW YORK.

RANGE-FINDER.

1,270,545.

Specification of Letters Patent. Patented June 25, 1918.

Application filed May 31, 1916. Serial No. 100,847.

*To all whom it may concern:*

Be it known that I, PERLEY G. NUTTING, of Rochester, in the county of Monroe and State of New York, have invented certain new and useful Improvements in Range-Finders; and I do hereby declare the following to be a full, clear, and exact description of the same, reference being had to the accompanying drawings, forming a part of this specification, and to the reference-numerals marked thereon.

My present invention relates to range finders or telemeters for determining the distance of an observed object from the point of observation, and it relates more specifically to that class in which an adjustable member is employed to obtain the coincidence or alinement of two normally non-coincident or unalined images of an observed object, the displacement of the adjustable member when the images are coincident indicating on a scale the range of the object. One of the objects of my invention is to provide a simple instrument that will be both optically sensitive and mechanically insensitive and which will therefore enable the determination of the distance of objects at different ranges, to be made easily and accurately. To these and other ends the invention resides in certain improvements and combinations of parts all as will be hereinafter more fully described, the novel features being pointed out in the claims at the end of the specification.

In the drawings:

Figure 1 is a side elevation of a range finder constructed in accordance with and illustrating one embodiment of my invention;

Fig. 2 is a longitudinal sectional view thereof;

Fig. 3 is a cross sectional view on the line 3—3 of Fig. 2;

Fig. 4 is a similar view on the line 4—4 of Fig. 2;

Fig. 5 is a fragmentary longitudinal detail sectional view on the line 5—5 of Fig. 2;

Fig. 6 is a fragmentary detail view of the under side of the tube showing the scale for indicating the distance of an object;

Fig. 7 is a view showing features of the invention embodied in a gun-sight and range finder, the same being shown in side elevation; and Fig. 8 is a diagrammatic view showing the optical system of Fig. 7.

Similar reference numerals throughout the several figures indicate the same parts.

In carrying out my invention in the present instance, I establish a base line on the distance of separation of two substantially parallel mirrors upon which separate images of the objects are viewed simultaneously from an angle of 45°, one of the mirrors is semi-transparent so that the other mirror can reflect the rays of its image through it and make possible the superpositioning of the images from a common viewpoint. As the angle of incidence of rays from the object is different on the two mirror surfaces, the images will not normally register but an adjustable or variable optical element is utilized to correct the angle of one in accordance with that of the other resulting in the exact register of the two images. The said adjustable element coöperates with a scale and the reading on this scale after the registration of the images has been effected is a true reading of the distance or range of the object from the instrument. For very distant objects the adjustable element is made more sensitive so that registration of the images can be effected with greater ease and certainty.

Referring more particularly to the drawings, 1 and 2 indicate a pair of reflectors spaced from each other within a tube 3 and arranged in parallelism to each other at an angle of approximately 45° to the axis of the tube. Openings 4 are provided in one side of the tube adjacent the reflectors in order to admit relatively angular rays of light A, B from the object to the respective reflectors. Assuming that the rays A are the more direct rays from the image, that is, that their path is normal to the axis of the tube 3, it follows that these rays will be directed by the reflector 1 down the axis of the tube and along the axis of a telescope 5 which forms an extension of the tube and magnifies the size of the image produced by the reflector from the point of observation C which is the eye-piece of the telescope.

The rays A being normal to the axis of the tube, it follows that the rays B emanating from the same object will strike the reflector 2 at a different angle and will be reflected through the tube at a corresponding divergence from the line of the axis thereof and of the rays A after reflection, the angle and divergence being greater with a near object than with a far object.

It being required that the images cast by both reflectors be viewable from the same point of observation, I provide a simple arrangement for permitting the transmission of the rays B to the eye-piece C and it consists in making the reflector 1 semi-transparent by incompletely silvering the back of a glass mirror plate so that it will both transmit and reflect the rays of light. The image formed by the rays B reflected at 2 passes through the mirror 1 and becomes visible at C together with the image formed by the rays A reflected at 1.

Because of the angular direction of the rays B and their deflection within the tube 3 after reflection at 2, as heretofore described, the two images as viewed at C will appear out of register and a double outline of the object will be seen with part of one image overlapping the other. The lack of register will be more pronounced if the object is near than if far away, accordingly as the relative angle of the ray B is greater or less. But in either instance, registration of the two images can be effected by bending the ray or rays B back into alinement with the axis of the tube 3 and with the reflected ray A before the ray B reaches the semi-transparent mirror 1. Further, by utilizing an adjustable element for this purpose and indicating its movements upon a distance scale, a direct reading can be obtained of the distance from the instrument of a given object accordingly as the relative angle of rays A and B emanating therefrom require a greater or a less movement of the adjustable element to straighten one ray into alinement with the other after reflection within the instrument.

In the practice of my invention, I produce coincidence of the images by the employment of a deflecting member E (Fig. 8) which is interposed in the path of the ray B and is movable laterally of the axis of the tube to bend said ray until it coincides in direction with the reflected ray A. The displacement of the member E then indicates the distance of the object on a scale D. In the present instance, the deflecting member E is one of a pair of respectively convex and concave lenses E—F of the same focal length, that work in conjunction with each other and which normally occupy a position with their optical axes in alinement with that of the telescope. The focal lengths of these lenses are coördinated with the distance of separation of the mirrors 1 and 2 and the operation of the pair of compensating lenses is merely that of a wedge of variable angle.

The deviation produced by this pair of lenses is dependent upon two factors: (1) the displacement from the coaxial position, and (2) the equivalent focal length of each component. Hence, the focal length of either lens determines and is proportional to the sensibility of the instrument, namely, the displacement required to bring into coincidence two beams of light from a given distant object.

Referring to Fig. 8, assume that the instrument has been sighted on an object at the distance R, and that the images register when the lens E has been displaced a distance $c$ from the optical axis. Then since the ray B after reflection from the mirror 2 has a direction toward the focus of the lens F, the following relation holds true:

$$\frac{c}{f}=\frac{m}{R} \text{ or } c=\frac{fm}{R}$$

where $f$ is the focal length of the lens F and $m$ is the distance between the mirrors 1 and 2.

In practice, $f$ is so chosen that $c$ is a distance conveniently measured on a screw (about 1 millimeter), for the range R at which the instrument is intended to operate. For example, if the mirror distance $m=20$ centimeters and the focal length of the deflecting lenses $f=40$ meters, the displacement $c$ necessary for setting on an object at 10,000 meters will be .8 millimeter.

One of the objects of my present invention is to provide an instrument in which the making of readings at different ranges is facilitated, and in the present instance this is accomplished by providing a plurality of deflecting members E, E′, and E² of different focal lengths according to the range R at which the instrument is intended to operate. In making an observation, that one of the deflecting members is employed which will give an indication of greatest accuracy with the least degree of adjustment, the others being previously moved to an inoperative position.

In Fig. 2, these deflecting members are lenses indicated by E, E′ and E², E being used for distances from infinity to 10,000 meters, E′ for distances from infinity to 1,000 meters and E² for distances from infinity to 100 meters. The focal lengths are, respectively, 40 meters, 4 meters and 40 centimeters, and the displacement of each at the distances mentioned is .8 millimeters. In order to permit the use of each deflecting member separately, the others must be moved into an inoperative position. In the present instance, each of the lenses E, E′ and E² is adjacent a complementary lens indicated by F, F′ and F², respectively, and the lenses of each pair when alined optically neutralize each other and no bending or deflection of the rays occurs. Therefore, when making a reading by adjusting a member of one pair, the lenses of the other pairs are alined optically with the telescope, and do not have any effect in deflecting the ray B.

The lenses E, E' and E² are each carried in slides 6 movable transversely of the axis of the telescope in guideways formed in blocks 7, secured in juxtaposition by plates 8, fastened at opposite ends of the blocks by screws 9, the extreme blocks being provided with cylindrical reduced portions upon which fit the two opposite portions of the tube 3. The lenses F, F' and F² are carried by the blocks 7, adjacent the lenses E, E' and E². Each of the slides 6 is moved longitudinally by means of a screw 9 journaled in one of the plates 8 and threaded within the slide. A projection 10 on the slide extends through a slot 11 in the block 7 and coöperates with divisions of a scale D to indicate the distance of the object viewed, the subdivisions being read from graduations on a cylindrical portion 12 on the screw coöperating with an index 12ᵃ on the block 7. Springs 13 interposed between one of the plates 8 and the slide 6 serve to prevent lost motion of the latter.

In Fig. 7 I have shown a modified structure for use as a gun-sight in which the tube 18 extends vertically and the telescope 19 is disposed at right angles thereto. The rays A in this case pass through the mirror 1 while the rays B are reflected thereby, as shown in Fig. 8. The range finder is carried on the gun barrel and is movable angularly thereto by adjusting means movable with the deflecting means, whereby the gun will be given the proper trajectory when the images are in coincidence. In the present instance the range finder is pivoted at 20 to a bracket 21 on the gun barrel 22, and is moved relatively thereto by means of a cam 23, moved in unison with the screw 9 by means of a pinion 24 meshing with a gear 25 on the cam, said cam engaging a roller, or abutment 26 on an extension 27 of the bracket 21. In sighting an object the gun is elevated as the screw 9 is adjusted, the cam being so designed as to give the proper angle of elevation of the gun for every distance. A yielding connection is provided for the purpose of preventing the recoil of the gun from injuring the instrument, said connection consisting of a spring 28 engaging the instrument and gun at its opposite ends as at 29 and 30, and normally acting to keep the cam 23 in contact with the roller 26.

When the gun is fired the recoil moves the pivot 20 rearwardly, and the inertia of the instrument causes it to rock forwardly against the tension of the spring 18, the cam 23 moving out of contact with the roller 26. A dash pot consisting of a cylinder 31 on the gun and a piston 32 operating therein and connected to the tube 19 allows the instrument to move freely in this direction, but prevents jarring when the spring 28 returns the cam 23 into contact with the roller 26.

I claim as my invention:

1. In a range finder, the combination with means for directing one of two sets of rays of light emanating from an object at an angle to each other in the same general direction as the other set to produce two images viewable from the same point of observation, of a plurality of deflecting members of relatively different power for selectively bending the rays of one image into coincidence with those of the other to cause the images to register, and means for operating one deflecting member to a neutral position while another is in use.

2. In a range finder, the combination with a pair of reflectors for directing rays of light from an object into position to enable an observer to see two separate images thereof, of a plurality of deflecting members of different power independently movable in the path of the rays of one image for bending the rays and causing coincidence of the images, and indicating means movable with each of the deflecting members to determine the distance of the object when the images are in coincidence.

3. In a range finder, the combination with means for directing one of two sets of rays of light emanating from an object at an angle to each other in the same general direction as the other set to produce two images viewable from the same point of observation, of a plurality of deflecting members of relatively different power for selectively bending the rays of one image into coincidence with those of the other to cause the images to register, each deflecting member being movable to a neutral position in the path of the rays.

4. In a range finder, the combination with means for directing one of two sets of rays of light emanating from an object at an angle to each other in the same general direction as the other set to produce two images viewable from the same point of observation, of a plurality of deflecting members of relatively different power for selectively bending the rays of one image into coincidence with those of the other to cause the images to register, each deflecting member comprising a pair of complementary lenses of the same focal length, one of which is movable relatively to the other in a direction laterally of their common axis.

5. In a range finder, the combination with a pair of reflectors for directing rays of light from an object into position to enable an observer to see two separate images of the object, and a telescope for magnifying the images, of a plurality of pairs of lenses of different focal lengths arranged in the path of the rays to one reflector, each pair consisting of a convex and concave lens arranged with their optical axes normally in alinement with that of the telescope, one lens of each pair being fixed and the other movable laterally of the axis of the telescope, independent adjusting means for displacing each of the movable lenses across the path of the rays to cause coincidence of the images, and indicators operated by each of the adjusting means to determine the distance of the object when the images are in coincidence.

PERLEY G. NUTTING.

Witnesses:
AGNES NESBITT BISSELL.
RUSSELL B. GRIFFITH.

Copies of this patent may be obtained for five cents each, by addressing the "Commissioner of Patents, Washington, D. C."